US010343375B2

(12) United States Patent
Kim (10) Patent No.: US 10,343,375 B2
(45) Date of Patent: Jul. 9, 2019

(54) LOW-RESISTANCE CONDUCTIVE TAPE ENHANCING AND MAINTAINING RF PERFORMANCE AND HAVING EXCELLENT EFFECT OF PREVENTING GALVANIC CORROSION AND OXIDATION

(71) Applicant: ICH CO., LTD., Gunpo-si, Gyeonngi-do (KR)

(72) Inventor: Young Hun Kim, Ansan-si (KR)

(73) Assignee: ICH CO., LTD (KR)

( * ) Notice: Subject to any disclaimer, the term of this patent is extended or adjusted under 35 U.S.C. 154(b) by 0 days.

(21) Appl. No.: 15/920,649

(22) Filed: Mar. 14, 2018

(65) Prior Publication Data

US 2019/0039351 A1 Feb. 7, 2019

(30) Foreign Application Priority Data

Aug. 3, 2017 (KR) .................. 10-2017-0098352

(51) Int. Cl.
*B32B 7/02* (2019.01)
*B32B 15/14* (2006.01)
(Continued)

(52) U.S. Cl.
CPC .............. *B32B 15/14* (2013.01); *B32B 5/022* (2013.01); *B32B 7/12* (2013.01); *B32B 15/20* (2013.01);
(Continued)

(58) Field of Classification Search
CPC ..... B32B 15/082; B32B 15/14; B32B 15/095; B32B 15/20; B32B 27/12; B32B 27/308;
(Continued)

(56) References Cited

U.S. PATENT DOCUMENTS

| 9,061,478 | B2* | 6/2015 | Choi | .................. B32B 5/022 |
| 2012/0227786 | A1* | 9/2012 | Hayashi | .................. C09J 9/02 |
| | | | | 136/244 |
| 2016/0021798 | A1* | 1/2016 | Kim | .................. H05K 9/0015 |
| | | | | 174/358 |

FOREIGN PATENT DOCUMENTS

| KR | 10-0528435 B1 | 11/2005 |
| KR | 2009-0009499 A | 1/2009 |

(Continued)

OTHER PUBLICATIONS

Notice Requesting Submission of Opinion dated Sep. 19, 2017 in corresponding KR Application No. 10-2017-0098352.
(Continued)

*Primary Examiner* — Maria V Ewald
*Assistant Examiner* — Zachary M Davis
(74) *Attorney, Agent, or Firm* — Harness, Dickey & Pierce, PLC (57) ABSTRACT

Disclosed is a low-resistance conductive tape enhancing and maintaining RF performance and having an excellent effect of preventing galvanic corrosion and oxidation. More particularly, the low-resistance conductive tape includes a conductive fiber layer including conductive fibers, a conductive adhesive layer formed on an upper side and a lower side of the conductive fiber layer, and a metal layer which is formed on one side of the conductive fiber layer having the conductive adhesive layer formed thereon and which includes copper plated with nickel. In the low-resistance conductive tape, since the metal layer including copper plated with nickel is formed, an excellent effect of preventing galvanic corrosion and an excellent moisture-blocking effect are exhibited, and an acrylic adhesive containing no acid component is used, thus securing an excellent effect of preventing oxidation.

3 Claims, 6 Drawing Sheets (51) Int. Cl.
  *B32B 15/20* (2006.01)
  *B32B 7/12* (2006.01)
  *B32B 5/02* (2006.01)

(52) U.S. Cl.
  CPC ....... *B32B 2250/02* (2013.01); *B32B 2255/02* (2013.01); *B32B 2255/06* (2013.01); *B32B 2255/205* (2013.01); *B32B 2255/26* (2013.01); *B32B 2262/0276* (2013.01); *B32B 2264/102* (2013.01); *B32B 2264/105* (2013.01); *B32B 2307/202* (2013.01); *B32B 2307/714* (2013.01); *B32B 2307/7265* (2013.01); *B32B 2307/752* (2013.01); *B32B 2405/00* (2013.01)

(58) Field of Classification Search
  CPC ....... C09J 9/02; H09K 9/0009; H09K 9/0015; H09K 9/0047; H09K 9/0073; H09K 9/0081; H09K 9/0084; H09K 9/0088; H09K 9/009
  USPC .......................................... 428/209, 344, 356
  See application file for complete search history.

(56) References Cited

FOREIGN PATENT DOCUMENTS

| | | |
|---|---|---|
| KR | 10-0956432 B1 | 5/2010 |
| KR | 2016-0059059 A | 5/2016 |
| KR | 10-1679336 B1 | 11/2016 |

OTHER PUBLICATIONS

Decision to Grant a Patent dated Dec. 20, 2017 in corresponding KR Application No. 10-2017-0098352.

\* cited by examiner

Example 1 — Corrosion due to oxidation (blackening)

Comparative Example 1 — Separation from top structure due to oxidation

FIG. 4

Example 1     Comparative Example 2     Comparative Example 3

LOW-RESISTANCE CONDUCTIVE TAPE ENHANCING AND MAINTAINING RF PERFORMANCE AND HAVING EXCELLENT EFFECT OF PREVENTING GALVANIC CORROSION AND OXIDATION

CROSS-REFERENCE TO RELATED APPLICATIONS

This application is based on and claims priority from Korean Patent Application No. 10-2017-0098352 filed Aug. 3, 2017 in the Korean Intellectual Property Office, the disclosure of which is incorporated herein in its entirety by reference.

BACKGROUND OF THE INVENTION

1. Field of the Invention

The disclosure relates to a low-resistance conductive tape enhancing and maintaining RF performance and having an excellent effect of preventing galvanic corrosion and oxidation. More particularly, the disclosure relates to a low-resistance conductive tape enhancing and maintaining RF performance and having an excellent effect of preventing galvanic corrosion and oxidation, the tape including a metal layer and an acrylic adhesive containing no acid component. Since the metal layer including copper plated with nickel is formed, an excellent effect of preventing galvanic corrosion and an excellent moisture-blocking effect are exhibited, and the acrylic adhesive containing no acid component is used, thus securing an excellent effect of preventing oxidation.

2. Description of the Related Art

A metallic case is frequently used in IT devices having a communication (antenna) function. For example, in the case of mobile phones, among IT devices, when the metallic case of the IT device comes into direct contact with a conductive contact terminal (C-clip) existing on the front and rear sides of a printed circuit board, there is a problem in that one metal is corroded due to a galvanic phenomenon that occurs when metals come into contact with each other.

In order to solve the above-described problem, there is continuing effort to suppress the galvanic phenomenon and to maintain the RF performance of IT devices by applying conductive tape having conductivity between the conductive contact terminal (C-clip) and the metallic case of the IT device.

Meanwhile, an electrically conductive tape generally includes a conductive metal foil such as copper and aluminum, a conductive adhesive, and a release paper. In general, a conventional conductive tape having the above-described structure is constituted so that a conductive metal such as aluminum foil and copper foil is adhered to a release paper coated with a conductive adhesive, or is constituted so that the surface of a conductive metal foil is treated with a releasing agent to thus wind the tape without a release paper.

The conductive adhesive refers to an adhesive having appropriate conductivity, depending on the amount of metal powder, by adding a predetermined amount or more of conductive metal powder to an adhesive material which is manufactured by dissolving rubber or an acrylic resin in an organic solvent.

However, the conventional conductive tape has a problem in that when the conductive metal such as copper and aluminum is exposed to moisture, the surface thereof is oxidized, which causes a corrosion phenomenon. Due to the corrosion phenomenon, the performance of the conductive tape is reduced, or components constituting the conductive tape are oxidized by the acid component contained in the conductive adhesive, thus increasing the resistance value of the conductive tape.

SUMMARY OF THE INVENTION

Accordingly, the disclosure has been made keeping in mind the above problems occurring in the related art, and an aspect of the disclosure is to provide a low-resistance conductive tape enhancing and maintaining a RF performance and having an excellent effect of preventing galvanic corrosion and oxidation, the tape including a metal layer and an acrylic adhesive containing no acid component. Since the metal layer including copper plated with nickel is formed, an excellent effect of preventing galvanic corrosion and an excellent moisture-blocking effect are exhibited, and the acrylic adhesive containing no acid component is used, thus securing an excellent effect of preventing oxidation.

Another aspect of the disclosure is to provide a low-resistance conductive tape enhancing and maintaining RF performance and having an excellent effect of preventing galvanic corrosion and oxidation, the tape including a urethane coating layer. The urethane coating layer is formed, thus suppressing surface contamination of the conductive tape caused by a conductive adhesive and further enhancing waterproofness.

In order to accomplish the above aspects, the disclosure provides a low-resistance conductive tape enhancing and maintaining RF performance and having an excellent effect of preventing galvanic corrosion and oxidation. The low-resistance conductive tape includes a conductive fiber layer including conductive fibers, a conductive adhesive layer formed on an upper side and a lower side of the conductive fiber layer, and a metal layer which is formed on one side of the conductive fiber layer having the conductive adhesive layer formed thereon and which includes copper plated with nickel.

Preferably, a urethane coating layer, which exhibits a waterproof effect and which includes indium tin oxide mixed therewith to exhibit conductivity, may be further formed between the metal layer and the conductive adhesive layer.

More preferably, the urethane coating layer may be formed to a thickness of 5 to 10 micrometers, and may include 100 parts by weight of urethane and 1 to 2 parts by weight of the indium tin oxide.

More preferably, the conductive fiber layer may be formed to a thickness of 10 to 100 micrometers, and may be formed by coating synthetic fibers with one conductive metal selected from the group consisting of copper, nickel, iron, zinc, lead, gold, and silver.

Even more preferably, the conductive adhesive layer may be formed to a thickness of 1 to 20 micrometers, and may be formed by mixing a conductive metal powder with an acrylic adhesive containing no acid component.

Even more preferably, 100 parts by weight of the acrylic adhesive containing no acid component may be mixed with 15 to 20 parts by weight of the conductive metal powder to form the conductive adhesive layer.

Even more preferably, the conductive metal powder may include a silver powder and a nickel powder.

Even more preferably, the metal layer may be formed to a thickness of 5 to 100 micrometers.

In a low-resistance conductive tape enhancing and maintaining RF performance and having an excellent effect of preventing galvanic corrosion and oxidation, since a metal layer including copper plated with nickel is formed, an excellent effect of preventing galvanic corrosion and an excellent moisture-blocking effect are exhibited, and an acrylic adhesive containing no acid component is used, thus securing an excellent effect of preventing oxidation.

Further, in the conductive tape, a urethane coating layer is formed, thus suppressing surface contamination caused by a conductive adhesive and further enhancing waterproofness.

BRIEF DESCRIPTION OF THE DRAWINGS

The above and other aspects, features and advantages of the present invention will be more clearly understood from the following detailed description taken in conjunction with the accompanying drawings, in which.

DESCRIPTION OF THE PREFERRED EMBODIMENTS

The preferred embodiments and physical properties of components of the present invention will be described in detail hereinafter. This is for the purpose of illustrating the present invention in such a manner that those of ordinary skill in the art can easily carry out the invention, but it is not intended to limit the technical spirit and scope of the present invention.

Figure 1:
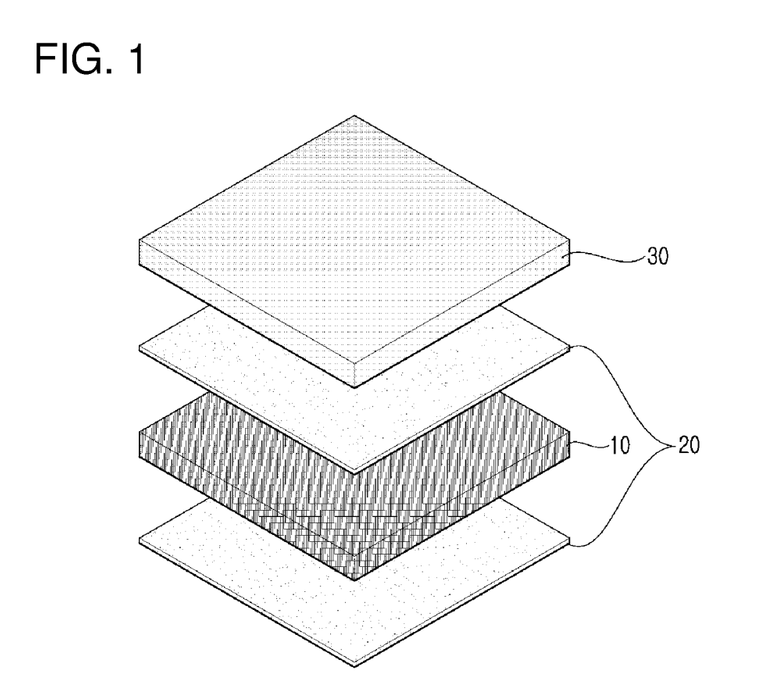
FIG. 1 is an exploded perspective view showing a low-resistance conductive tape enhancing and maintaining RF performance and having an excellent effect of preventing galvanic corrosion and oxidation according to a disclosed embodiment.

The disclosed low-resistance conductive tape enhancing and maintaining RF performance and having an excellent effect of preventing galvanic corrosion and oxidation includes a conductive fiber layer 10 including conductive fibers, a conductive adhesive layer 20 formed on an upper side and a lower side of the conductive fiber layer 10, and a metal layer 30 which is formed on one side of the conductive fiber layer 10 having the conductive adhesive layer 20 formed thereon and which includes copper plated with nickel.

The conductive fiber layer 10 is a base layer of the disclosed low-resistance conductive tape enhancing and maintaining RF performance and having an excellent effect of preventing galvanic corrosion and oxidation. The conductive fiber layer is formed to a thickness of 10 to 100 micrometers, and is formed by coating synthetic fibers with one conductive metal selected from the group consisting of copper, nickel, iron, zinc, lead, gold, and silver. The conductive fiber layer serves to impart conductivity to the low-resistance conductive tape enhancing and maintaining RF performance and having an excellent effect of preventing galvanic corrosion and oxidation and also serves to prevent deformation of the conductive tape by external force.

When the thickness of the conductive fiber layer 10 is less than 10 micrometers, the conductive tape may be easily deformed or broken due to external force. When the thickness of the conductive fiber layer 10 is more than 100 micrometers, the thickness of the conductive tape is excessively increased, and the excessive increase in thickness is not suitable for IT devices which are reduced in size.

The synthetic fibers preferably include components such as polyester or polyethylene terephthalate, and may be applied as both woven and non-woven types. Preferably, the synthetic fibers are selectively applied depending on the application area of the conductive tape, and it is preferable to use an electroless plating method as a method of coating the synthetic fibers with the conductive metal.

The conductive adhesive layer 20 is formed to a thickness of 1 to 20 micrometers on the upper side and the lower side of the conductive fiber layer 10. The conductive adhesive layer includes a conductive adhesive obtained by mixing an acrylic adhesive containing no acid component with conductive metal powder. The conductive adhesive layer enables one side of the conductive fiber layer 10 to be adhered to the metal layer 30 and the other side of the conductive fiber layer 10 to be adhered to the metallic case of an IT device.

The conductive adhesive layer 20 includes the conductive adhesive obtained by mixing 100 parts by weight of the acrylic adhesive containing no acid component with 15 to 20 parts by weight of the conductive metal powder. When the conductive adhesive layer 20 is formed using the conductive adhesive manufactured by mixing the acrylic adhesive containing no acid component with the conductive metal powder, it is possible to suppress the occurrence of oxidation in the conductive tape due to the acid component remaining in the adhesive.

Further, when the content of the conductive metal powder is less than 15 parts by weight based on 100 parts by weight of the acrylic adhesive containing no acid component, the conductive performance of the conductive adhesive layer 20 is reduced. When the content of the metal powder is more than 20 parts by weight, the conductive performance of the conductive adhesive layer 20 is not greatly enhanced, and the adhesive strength of the conductive adhesive layer 20 is reduced.

Preferably, the conductive metal powder includes silver powder and nickel powder having a particle size of 0.1 to 0.3 micrometers. When the particle size of the conductive metal powder is less than 0.1 micrometers, since the particle size is excessively small, the conductive metal powder may not be uniformly mixed with the acrylic adhesive containing no acid component, but may agglomerate. When the particle size of the conductive metal powder is more than 0.3 micrometers, the adhesive strength of the conductive adhesive layer 20 is reduced.

Further, it is preferable to use conductive metal powders having both spherical and cylindrical particle shapes. When metal powders having spherical and cylindrical particle shapes are used, since the gap between the metal powder particles is minimized, the conductive performance of the conductive adhesive layer 20 may be further enhanced.

The metal layer 30 is formed to a thickness of 5 to 100 micrometers on one side of the conductive fiber layer 10 having the conductive adhesive layer 20 formed thereon. The metal layer includes copper plated with nickel, and serves to block moisture or salt, thus suppressing the corrosion of the conductive tape.

Conventionally, a conductive metal including copper or aluminum is applied to one side of the conductive tape. However, since copper or aluminum is easily corroded when exposed to moisture or salts, it is preferable to apply a conductive metal manufactured by plating the surface of copper with nickel in order to prevent the above-described problem.

When the thickness of the metal layer 30 is less then 5 micrometers, the effect of suppressing the corrosion of the conductive tape due to moisture or salt is insignificant. When the thickness of the metal layer 30 is more than 100 micrometers, since the thickness and the weight of the conductive tape are excessively increased, it is difficult to apply the metal layer to IT devices which are reduced in size.

Figure 2:
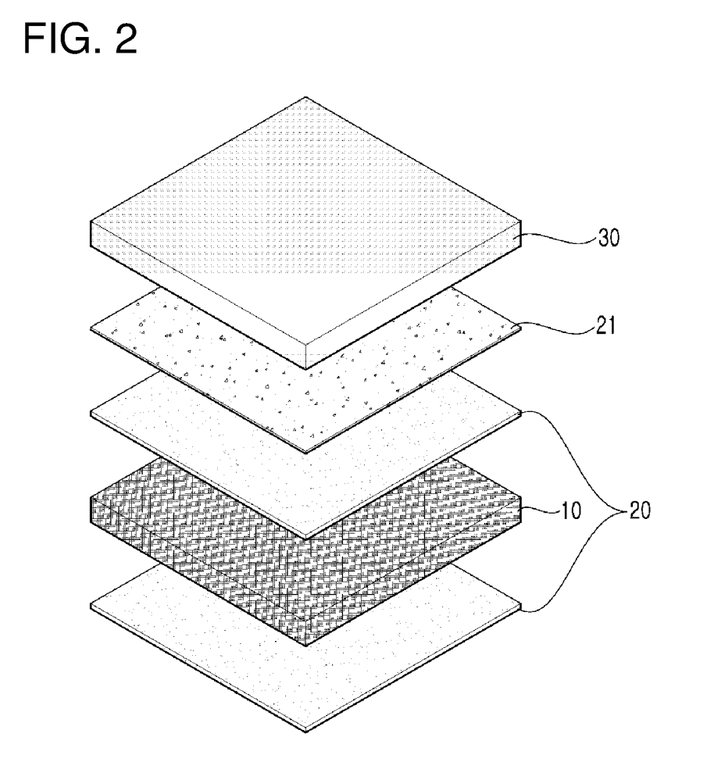
FIG. 2 is an exploded perspective view showing a low-resistance conductive tape enhancing and maintaining RF performance and having an excellent effect of preventing galvanic corrosion and oxidation according to another disclosed embodiment.

Further, a urethane coating layer 21, which exhibits a waterproof effect and which includes indium tin oxide mixed therewith to exhibit conductivity, may be further formed between the metal layer 30 and the conductive adhesive layer 20. In addition to the above-described effects, the urethane coating layer 21 serves to prevent a conductive adhesive component from leaking into the metal layer 30 during the formation of the conductive adhesive layer 20, thereby suppressing the contamination of the metal layer 30 due to the conductive adhesive.

Further, preferably, the urethane coating layer 21 is formed to a thickness of 5 to 10 micrometers and includes 100 parts by weight of urethane and 1 to 2 parts by weight of indium tin oxide. A water-soluble urethane resin having a solid content of 30 wt % is selected as the urethane, and the weight ratio of the water-soluble urethane and water is most ideally 3:17. The above-described mixture is mixed with 1 to 2 parts by weight of indium tin oxide (ITO) and agitated to thus manufacture a mixture, and the resulting mixture is applied and dried on the metal layer on a comma coater or doctor blade equipment, thus forming the urethane coating layer. The moisture contained in the urethane resin is removed during the drying process.

When the urethane coating layer 21 having the above-described thickness is formed, moisture that may be generated due to the temperature change of the metal layer 30 is not transferred to the conductive adhesive layer 20. Accordingly, a reduction in the physical properties and adhesive strength of the conductive adhesive layer 20 may be prevented, and the conductive adhesive may be prevented from being exposed to the outer surface of the metal layer.

When the thickness of the urethane coating layer 21 is less than 5 micrometers, since cracks may easily occur in the urethane coating layer 21 due to external force, the above-described effect cannot be exhibited. When the thickness of the urethane coating layer 21, is more than 10 micrometers, the above-described effect is not greatly enhanced, and the thickness of the conductive tape is undesirably increased.

Hereinafter, a method of manufacturing the disclosed low-resistance conductive tape enhancing and maintaining RF performance and having an excellent effect of preventing galvanic corrosion and oxidation, and the physical properties of the low-resistance conductive tape manufactured using the manufacturing method will be described with reference to examples.

EXAMPLE 1

A conductive fiber layer was manufactured to a thickness of 50 micrometers using polyester non-woven fabrics coated with nickel. A conductive adhesive layer including 100 parts by weight of an acrylic adhesive containing no acid component and 17 parts by weight of conductive metal powder (the weight ratio of silver powder and nickel powder being 1:1) was formed to a thickness of 10 micrometers on the upper side and the lower side of the conductive fiber layer. A metal layer including copper plated with nickel was formed to a thickness of 50 micrometers on one side of the conductive fiber layer having the conductive adhesive layer formed thereon, thereby manufacturing a low-resistance conductive tape enhancing and maintaining RF performance and having an excellent effect of preventing galvanic corrosion and oxidation to a thickness of 110 micrometers.

COMPARATIVE EXAMPLE 1

A conductive fiber layer was manufactured to a thickness of 50 micrometers using polyester non-woven fabrics coated with nickel. A conductive adhesive layer including 100 parts by weight of an acrylic adhesive containing about 6% of an acid component and 4 parts by weight of conductive metal powder (copper powder) was formed to a thickness of 10 micrometers on the upper side and the lower side of the conductive fiber layer. A metal layer including copper coated with nickel was formed to a thickness of 50 micrometers on one side of the conductive fiber layer having the conductive adhesive layer formed thereon, thereby manufacturing a conductive tape to a thickness of 110 micrometers.

COMPARATIVE EXAMPLE 2

A conductive fiber layer was manufactured to a thickness of 50 micrometers using polyester non-woven fabrics coated with nickel. A conductive adhesive layer including 100 parts by weight of an acrylic adhesive containing about 6% of an acid component and 4 parts by weight of conductive metal powder (copper powder) was formed to a thickness of 10 micrometers on the upper side and the lower side of the conductive fiber layer. A metal layer including copper was formed to a thickness of 50 micrometers on one side of the conductive fiber layer having the conductive adhesive layer formed thereon, thereby manufacturing a conductive tape to a thickness of 110 micrometers.

COMPARATIVE EXAMPLE 3

A conductive fiber layer was manufactured to a thickness of 100 micrometers using polyester non-woven fabrics coated with copper. A conductive adhesive layer including 100 parts by weight of an acrylic adhesive containing about 6% of an acid component and 4 parts by weight of conductive metal powder (copper powder) was formed to a thickness of 10 micrometers on the upper side and the lower side of the conductive fiber layer, thereby manufacturing a conductive tape to a thickness of 110 micrometers.

Figure 3:
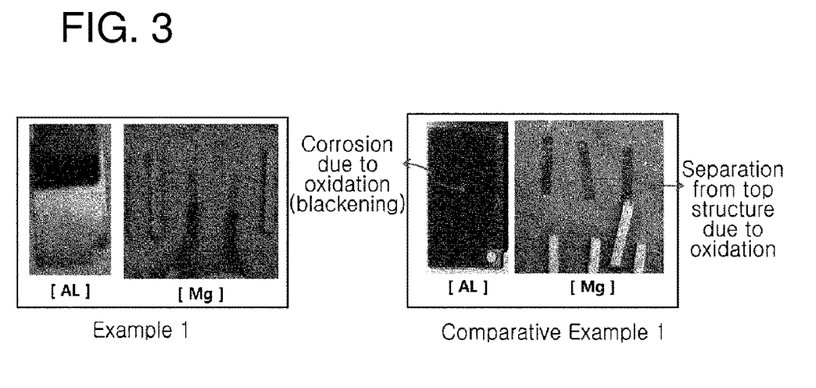
FIG. 3 is a picture obtained by measuring the oxidation-preventive effect of conductive tapes manufactured in Example 1 and Comparative Example 1 which are disclosed.

The effect of preventing oxidation of the conductive tapes manufactured in Example 1 and Comparative Example 1 was measured and is shown in the following FIG. 3.

The conductive tapes manufactured in Example 1 and Comparative Example 1 were attached to aluminum and magnesium panels, and the effect of preventing oxidation was measured under conditions of a temperature of 85° C. and a humidity of 85% for 128 hours.

As shown in the following FIG. 3, aluminum and magnesium to which the conductive tape manufactured in disclosed Example 1 was applied were not oxidized, but the aluminum to which the conductive tape manufactured in Comparative Example 1 was applied was corroded due to oxidation. For magnesium, it can be confirmed that separation of the metal layer including copper coated with nickel occurred due to oxidation of the adhesive layer.

Furthermore, the salt-water resistance of the conductive tapes manufactured in Example 1 and Comparative Examples 2 and 3 was measured and is shown in the following Table 1 and FIG. 4.

The salt-water resistance was obtained using a process of spraying salt water having a mass concentration of 5% on the conductive tapes manufactured in Example 1 and Comparative Examples 2 and 3 at a temperature of 35° C. for 24 hours, leaving as it is at room temperature for 4 hours, checking electrical resistance performance, and observing a change in appearance.

TABLE 1

| Classification | Example 1 | | Comparative Example 2 | | Comparative Example 3 | |
| --- | --- | --- | --- | --- | --- | --- |
| | Initial | After spraying of salt water | Initial | After spraying of salt water | Initial | After spraying of salt water |
| Resistance (Ω) | 0.13 | 0.12 | 0.14 | 0.16 | 0.18 | 3.12 |

Figure 4:
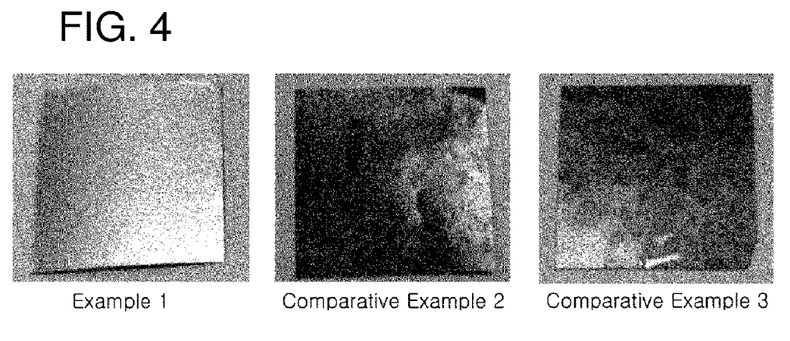
FIG. 4 is a picture obtained by measuring salt-water resistance of conductive tapes manufactured in Example 1 and Comparative Examples 2 and 3 which are disclosed.

As shown in the above-described Table 1 and the following FIG. 4, the conductive tape manufactured in disclosed Example 1 exhibited excellent salt-water resistance, and the conductive tape manufactured in Comparative Example 2 was maintained in terms of electrical resistance performance but the appearance thereof suffered due to corrosion. The conductive tape manufactured in Comparative Example 3 exhibited reduced electrical resistance performance and was corroded.

Figure 5:
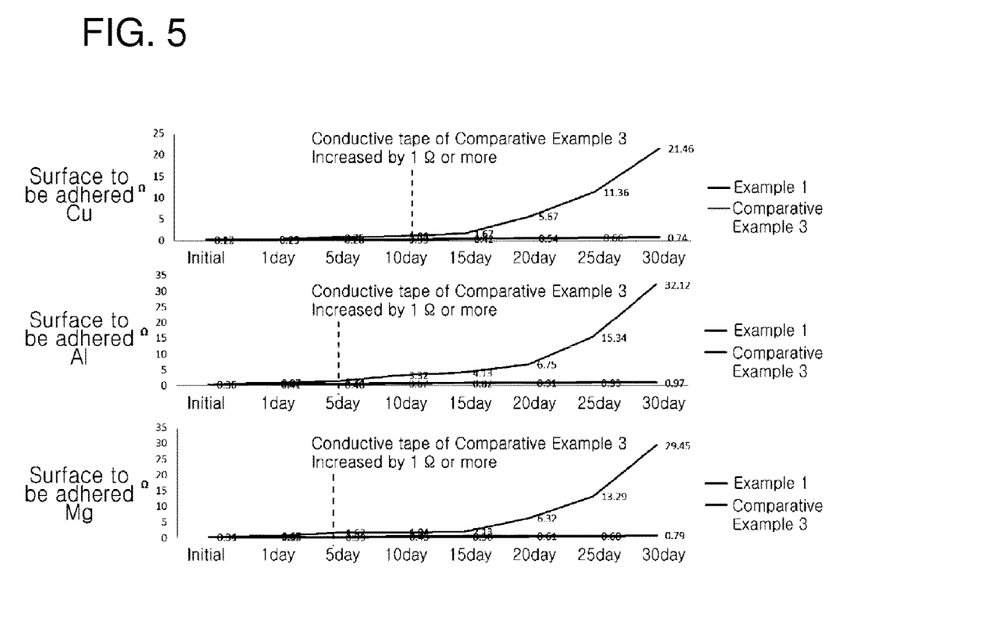
FIG. 5 is a graph obtained by measuring the high-temperature and high-humidity resistance performance of conductive tapes manufactured in Example 1 and Comparative Example 3 which are disclosed.

Further, the high-temperature and high-humidity resistance performance of the conductive tapes manufactured in Example 1 and Comparative Example 3 was measured and is shown in the following FIG. 5.

The conductive tapes manufactured in Example 1 and Comparative Example 3 were each attached to panels including copper, aluminum, and magnesium to manufacture 100 samples each having a length of 1 mm and a width of 1 mm. After the samples were exposed to conditions of a temperature of 80° C. and a humidity of 80% every five days for 30 days, the high-temperature and high-humidity resistance performance was measured using FLUKE 289 which was a resistance meter under the condition of 100 g & Ø0.8 probe, and the average value thereof was shown.

Figure 6:
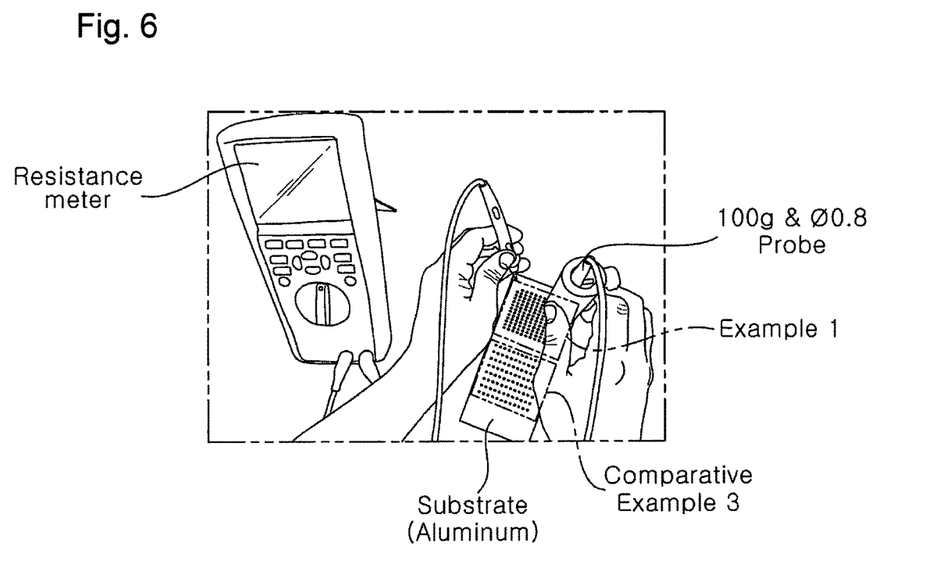
FIG. 6 is a picture showing a measurement method using the disclosed FLUKE 289.

The measurement method using FLUKE 289 is shown in the following FIG. 6.

As shown in the following FIG. 5, the conductive tape manufactured in disclosed Example 1 exhibits excellent high-temperature and high-humidity resistance performance compared to the conductive tape manufactured in Comparative Example 3.

Further, the RF performance of the conductive tapes manufactured in Example 1 and Comparative Example 3 was measured and is shown in the following Table 2.

Figure 7:
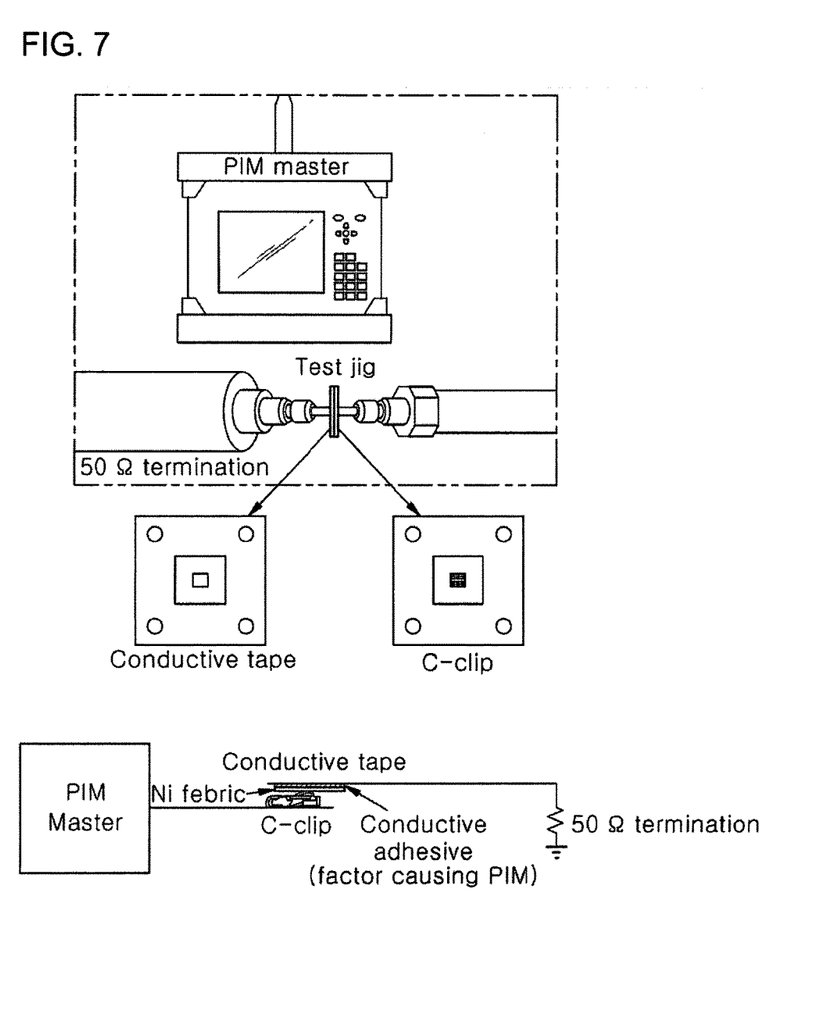
FIG. 7 is a picture showing a disclosed PIM master.

The RF performance was confirmed using a PIM master shown in the following FIG. 7. Nine sheets of each conductive tape manufactured in Example 1 and Comparative Example 3 were stacked and then tested in two tones of 870 MHz and 893 MHz. A fifth harmonics level (@824 MHz) was confirmed, and a Tx power level was 25 to 36 dBm, which was measured at room temperature.

TABLE 2

| Classification | Example 1 | Comparative Example 3 |
| --- | --- | --- |
| Fifth harmonics level | −105 dBm~−120 dBm | −88 dBm~−100 dBm |

As shown in the above-described Table 2, the conductive tape manufactured in disclosed Example 1 exhibited excellent RF performance compared to the conductive tape manufactured in Comparative Example 3.

Therefore, in the disclosed low-resistance conductive tape enhancing and maintaining RF performance and having an excellent effect of preventing galvanic corrosion and oxidation, since the metal layer including copper plated with nickel is formed, an excellent effect of preventing galvanic corrosion and an excellent moisture-blocking effect are exhibited, and an acrylic adhesive containing no acid component is used, thus securing an excellent effect of preventing oxidation. A urethane coating layer is formed, thus suppressing surface contamination caused by the conductive adhesive and further enhancing waterproofness.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A low-resistance conductive tape enhancing and maintaining RF performance and having an excellent effect of preventing galvanic corrosion and oxidation, the low-resistance conductive tape comprising:
   a conductive fiber layer including conductive fibers;
   a conductive adhesive layer formed on an upper side and a lower side of the conductive fiber layer; and
   a metal layer which is formed on one side of the conductive fiber layer having the conductive adhesive layer formed thereon and which includes copper plated with nickel,
   wherein the conductive fiber layer is formed to a thickness of 10 to 100 μm, and is formed by coating synthetic fibers with one conductive metal selected from the group consisting of copper, nickel, iron, zinc, lead, gold, and silver,
   the conductive adhesive layer is formed to a thickness of 1 to 10 μm, and is formed by mixing 100 parts by weight of an acrylic adhesive containing no acid component with 15 to 20 parts by weight of a conductive metal powder including a silver powder and a nickel powder and having a particle size of 0.1 to 0.3 μm, and
   the metal layer is formed to a thickness of 5 to 100 μm.

2. The low-resistance conductive tape of claim 1, wherein a urethane coating layer, which exhibits a waterproof effect and which includes indium tin oxide mixed therewith to exhibit conductivity, is further formed between the metal layer and the conductive adhesive layer.

3. The low-resistance conductive tape of claim 2, wherein the urethane coating layer is formed to a thickness of 5 to 10 micrometers and includes 100 parts by weight of urethane and 1 to 2 parts by weight of the indium tin oxide.

* * * * *